Figure 1:
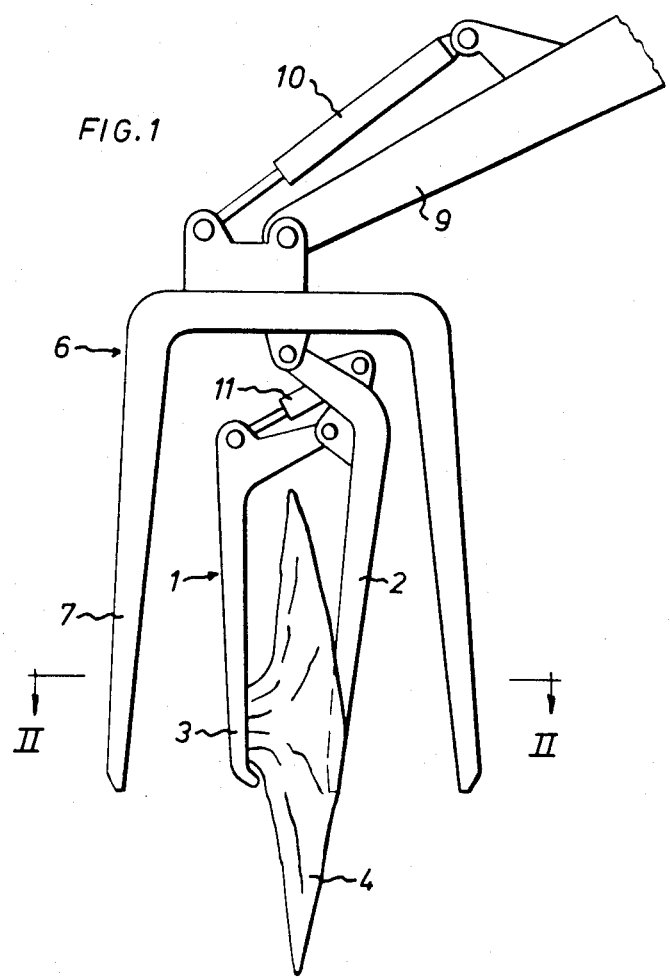

United States Patent [19]

Widegren

[11] Patent Number: 4,488,586
[45] Date of Patent: Dec. 18, 1984

[54] METHOD AND DEVICE FOR CLEANING STUMPS

[75] Inventor: Lars Widegren, Kiruna, Sweden

[73] Assignee: Elektro Diesel, Sweden

[21] Appl. No.: 466,643

[22] Filed: Feb. 15, 1983

[30] Foreign Application Priority Data

Feb. 16, 1982 [SE] Sweden ............................. 8200933

[51] Int. Cl.³ ........................... B27L 7/00; B27C 9/00
[52] U.S. Cl. ................................... 144/363; 144/2 N; 144/193 A; 144/366
[58] Field of Search ............. 144/2 N, 34 E, 2 R, 144/363, 366, 193 A, 334; 37/2 R

[56] References Cited

U.S. PATENT DOCUMENTS 3,814,152  6/1974  Pallari ............................ 144/2 N
4,069,846  1/1978  Forslund ......................... 144/2 N

FOREIGN PATENT DOCUMENTS 378502  9/1975  Sweden .
784835  12/1980  U.S.S.R. ........................ 144/2 N
865219  9/1981  U.S.S.R. ........................ 144/2 N
935000  6/1982  U.S.S.R. ........................ 144/2 N Primary Examiner—W. D. Bray
Attorney, Agent, or Firm—Shapiro and Shapiro

[57] ABSTRACT

The invention relates to a method of cleaning stumps from adherent impurities such as soil, stones, litter or the like and a device for carrying the method into effect. The object of the invention is to realize a more efficient and economical cleaning of stumps by grasping and retaining the stump by a gripping means, lifting up and bringing the stump to swing to and fro in order to strike against an out-of-phase pendulating or driven device whereby impurities are shaken off.

For carrying out the method a device is proposed including a gripping means which is articulated in or adjacent impact means, such as a frame or the like, and driving means adapted to set the frame swinging such that the stump grasped by the gripping means shaken by repeated impacts with the frame throughout the driving operation, whereby the impurities are shaken off.

12 Claims, 2 Drawing Figures

METHOD AND DEVICE FOR CLEANING STUMPS

The invention relates to a method and apparatus for cleaning stumps from adherent impurities such as soil, stones, litter etc.

Since several years it has been found that the situation concerning the supply of raw materials for the Swedish forest industry tends to grow more and more precarious and that the felling must be reduced to stand in due proportion to the regeneration, and in order to improve the situation various proposals have been put forward. One of the proposals amounts to using each tree in its entirety, i.e. not using only the stem, as had so far been the case, but also making use of twigs, tops and, more recently, also stubs and coarse roots. Before this the tree picking method had already been introduced, which implies that the trees are pulled up from the ground by means of a suitable machine. When pulled up the trees can be treated in various ways, e.g. be loaded as they are and be transported to a road fit for driving on. According to another proposal the stem after being pulled up is severed from the root system, whereby it is possible to obtain rather short stumps which then can be taken care of separately. Methods and devices for such picking up of complete trees are described, int.al., in Swedish Patent Specifications Nos. 327856, 365101 and 365112. In accordance therewith it is possible to obtain a higher stem yield but stubs and roots are left in the forest after the root separation.

In another process the stubs are chopped into chips which thereupon are further processed into pulp. A great problem and an important moment in connection with making use of stumps lies in cleaning the stumps from stone, gravel, sand, moss and small roots. When tackling this problem one has found it costly and difficult to solve. According to a known method the pulled-up stubs are transported from the woods by car to a tipping ramp in a mill site. In winter, for example, the stumps may contain up to 70% residues. The stumps are transmitted to a conveyor belt for transportation to rotary cleaning drums. In a first drum the stubs are cleaned in dry condition and stones and gravel fall out through openings in the drums walls. The next drum carries out washing with water and effects a further removal of gravel. The stumps then pass basins where stone and gravel sink to the bottom while the stumps themselves and the roots float. When the major part of the residues is cleaned away the stumps go to the cutting machines. It has been found at this stage that more or less gravel and stone still adhere or are ingrown in the root system, which makes it necessary to resharpen the cutting knives very often.

A principal object of the invention is to obtain a more efficient cleaning and avoid having to transport a large amount of gravel, soil, stone etc. from the woods to the stump refining mill. This must be done in an economically sound and time-saving manner and is so accomplished in accordance with the invention which, in one of its broad aspects, provides a method of cleaning a stump from adherent impurities, comprising providing gripping means, providing impact means associated with the gripping means and movable relative thereto, gripping and retaining the stump with the gripping means, lifting the stump, and colliding one of the stump and the gripping means with the impact means, whereby the impurities are shaken from the stump. The invention also provides apparatus for carrying out the foregoing method.

Cleaning tests according to this method with a prototype device have given very promising results as regards the cleanness of the stumps after the removal of impurities being detrimental to the knives of the cutting machines, such as soil, gravel, sand, stone etc., and also small roots, moss, litter etc. being of less interest from the point of view of pulping.

The invention is applicable to stumps which are substantially freed from the ground. Regarding ground-bound stumps the loosening can be carried out by means of any conventional stumper as well as by the device of this invention but also in connection with the operation of pulling up the trees according to the Swedish patent specifications mentioned in the above introduction, the trees being pulled up in their entirety, whereupon the separation of the roots takes place by means of saws, shearing tools, cutters or the like, and the root system/stump is left in the wood.

Figure 2:
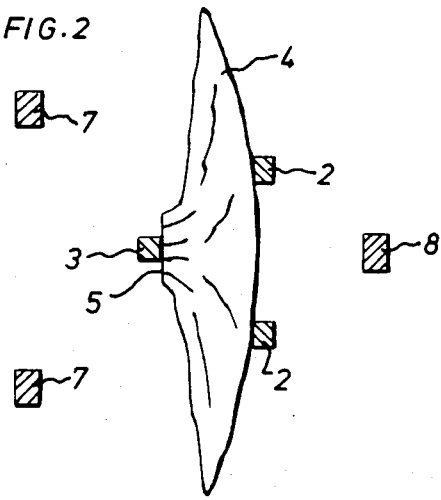

An embodiment of the present invention will now be described with reference to the accompanying drawing, in which:

FIG. 1 is a side view of a device according to the invention, grasping a stump and being suspended from a crane beam; and FIG. 2 is a section on line II—II in FIG. 1.

The fundamental idea in accordance with the preferred form of the invention to be described herein is that the stump is to be grasped and be suspended like the clapper in a church-bell and be swung to and fro in order to strike against the "bell" (impact means) and thus be cleaned by the resulting hard and repeated collision impacts which shake the stump, causing adherent impurities to be removed therefrom.

In the apparatus illustrated in the accompanying drawing for carrying out the method the clapper is in the form of a jaw-like gripping means 1 with two shanks 2 to be placed under the stump 4 and one shank 3 to be placed against or around the stump end 5 where the saw cut is situated. The gripping means 1, together with an operating means 11 (such as a hydraulic cylinder, as shown) for opening and closing the shanks 2, 3, is articulated in associated impact means such as a cage or frame 6 or the like, which in the present embodiment includes two impact members 7 on the top side of the stump and one impact member 8 in the centre of the under side of the stump, the impact members being elongate arms or bars in the form shown. The frame or cage 6 is pivotally suspended from the free end of a crane beam 9 and can be set swinging by driving means, herein shown as a hydraulic cylinder 10, comparable to the bell-ringer's rope.

It is of course possible within the scope of the invention to "invert" the apparatus so that only one shank 2 is placed under the stump 4 and two shanks 3 on its top side while the cage or frame 6 consists of one impact member 7 in the centre of the top side of the stump 4 and two impact members 8 on the under side of the stump. The drawing illustrates such an embodiment assuming that the stump is turned 180° and the reference numerals 2 and 3 as well as 7 and 8 are respectively interchanged. The use of the terms "frame" or "cage" does not exclude other embodiments. It is imperative that the "frame" or the like should be situated outside or beside the gripping means and be apt to bring about collisions with the stump (i.e., the stem portion or root system), which can take place directly or indirectly, e.g. via the gripping part.

When a ground-bound stump is to be grasped, the frame 6 with the gripping means 1 is swung to approximately horizontal position and is lowered to the ground level and the lower impact member 8 of the frame is driven in under the stump which is broken loose, whereupon the two lower shanks 2 of the gripping means are pressed in under the stump. If it is a matter of an already pulled-up stump the breaking moment is dispensed with but otherwise the procedure is practically the same at that just described. The stump is squeezed tight in the gripping means like in a pair of tongs because the gripping arm 3 is pressed from above against the stump 4, whereupon the frame 6 with the gripping means 1 and the stump 4 is lifted up so that they will hang straight down from the free end of the crane beam 9. The frame is then set swinging by means of the hydraulic cylinder 10 so that the stump will swing to an fro and repeatedly strike against the frame. Of course, for optimum cleaning effect, the stump and the frame must swing out of step so that the impacts on collision between the impact means and the stump will become as heavy as possible to shake the stump with maximum force. This requires a clear difference in velocity. As the stump is heavy, especially to begin with, relative to the frame or cage it may be suitable to arrange appropriate weights, for instance in the form of cavities cast with lead or filled with lead-shot, in the frame. Especially lead-shot gives rigid but efficient impacts without any major rebounding tendencies. Of course also other materials than lead may be used to obtain a high mass-efficiency of intertia.

In the example given the frame or cage has three arms (impact members), one on the bottom side and two on the top side of the stump. In this way two impacts are obtained for each pendulation of the frame. It is of course also conceivable to give the frame or cage another shape. The frame shanks arranged on the top side of the stump may, for instance, be interconnected to form a ring, a triangle, a quadrangle or the like which, like an open or closed ring, surrounds the centre of the stump and which, during shaking of the stump, strikes on the top side of the roots.

In another embodiment the stump may be shaken with the aid of an arm with gripping means and also by suitable impact means striking against the under side of the stump. The strokes with the impact or striking means may to this end be effected either by shaking the arm with the gripping means to and fro or by activating the striking means. This striking means can, like the above-mentioned frame or cage member 8 striking against the under side of the stump, be provided with projections, ribs or the like to make it easier to detach soil, stones or the like concentrated on the under side of the stump.

The shaking and striking movement produced during the cleaning of the stump can be utilized not only to detach soil, stones, moss and the like but simultaneously to cleave the stump successively. This may be effected, for instance, in that the jaw in the gripping means holding the stump during shaking is combined with a cleaving iron or the like which is pressed, for instance under pre-tension, against the stump and during the shaking operation is driven in "from above", i.e. in parallel with the direction of growth. When the root legs are hit by the frame they will deflect so that the penetration of the cleaving iron is facilitated and when the frame or striking means hits the stump from below the cleaving iron penetrates further inwards due to inertia.

Practical experiments with a prototype have shown that the method and device of the invention appear to be most superior to conventional methods of cleaning stumps, e.g. by vibration, high pressure spraying and the like. The device of the invention may be made very sturdy and is therefore resistant and reliable in operation. The device can also be automatized and the shaking can thus take place at a preset or variable frequency and amplitude.

In practice the invention leads to various savings and advantages. Thus, the stones, soil, moss, litter etc. removed from the stump are left in the forest and this may even take place over the holes produced in the ground when the stump is pulled up from the ground. The hole will then be filled with loose soil which facilitates new planting. Moreover, a load of cleaned stumps will be lighter than a corresponding load of uncleaned stumps and it contains, both proportionately and absolutely, definitely more wood for further processing. Preliminary calculations indicate also that cleaning of the stumps in accordance with the invention will result in reduced costs as compared to the methods hitherto known and applied.

What I claim and desire to secure by Letters Patent is:

1. A method of cleaning a stump from adherent impurities such as soil, stones, litter and the like, comprising providing gripping means, providing impact means associated with said gripping means and movable relative thereto, grasping and retaining said stump with said gripping means, lifting said stump in retention by said gripping means, and colliding one of said stump and said gripping means with said impact means, whereby said impurities are shaken from the stump.

2. A method in accordance with claim 1, wherein said grasping includes engaging jaw means with said stump.

3. A method in accordance with claim 1, wherein said colliding includes swinging said stump while the same is retained by said gripping means.

4. A method in accordance with claim 1, wherein said colliding is repetitive and includes driving said impact means in a pendular motion, the repetitive colliding causing said stump to swing out of phase with the pendular motion of said impact means.

5. A method in accordance with claim 4, wherein said pendular motion has a predetermined frequency and amplitude.

6. A method in accordance with claim 1, wherein said colliding includes alternately colliding one of said stump and said gripping means with a pair of impact members positioned adjacent to said gripping means at opposite sides thereof, said impact members constituting elements of said impact means.

7. A method in accordance with claim 1, further comprising cleaving said stump simultaneously with said colliding.

8. Apparatus for cleaning stumps from adherent impurities such as soil, stones, litter and the like, comprising gripping means for grasping and retaining a stump, impact means associated with said gripping means and having at least one impact member positioned adjacent to said gripping means and movable relative thereto, and means for shaking said stump by impact with said impact member, whereby said impurities are shaken from the stump.

9. Apparatus in accordance with claim 8, wherein said gripping means includes a pair of jaws and means for opening and closing said jaws.

10. Apparatus in accordance with claim 8, wherein said shaking means comprises means for swinging said stump.

11. Apparatus in accordance with claim 8, wherein said shaking means comprises means for driving said impact member in a pendular motion to cause repeated impacts therewith.

12. Apparatus in accordance with claim 11, wherein said impact means includes a pair of said impact members respectively positioned at opposite sides of said gripping means, said pendular motion causing impacts to occur alternately at the respective impact members.

* * * * *